(12) United States Patent
Orihashi et al.

(10) Patent No.: US 11,710,966 B2
(45) Date of Patent: Jul. 25, 2023

(54) SERVER AND POWER MANAGEMENT METHOD

(71) Applicant: TOYOTA JIDOSHA KABUSHIKI KAISHA, Toyota (JP)

(72) Inventors: Nobuyuki Orihashi, Toyota (JP);
Shigeki Kinomura, Toyota (JP);
Tamaki Ozawa, Toyota (JP); Chiaki Kanda, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2 days.

(21) Appl. No.: 17/577,662

(22) Filed: Jan. 18, 2022

(65) Prior Publication Data
US 2022/0247179 A1 Aug. 4, 2022

(30) Foreign Application Priority Data
Feb. 1, 2021 (JP) ................. 2021-014340

(51) Int. Cl.
*H02J 3/28* (2006.01)
*H02J 3/00* (2006.01)
*H02J 3/38* (2006.01)

(52) U.S. Cl.
CPC ............... *H02J 3/28* (2013.01); *H02J 3/003* (2020.01); *H02J 3/381* (2013.01)

(58) Field of Classification Search
CPC .... H02J 3/28; H02J 3/003; H02J 3/381; H02J 15/008; H02J 3/322; H02J 2300/20; H02J 2300/30; H02J 15/00; B60L 53/51; B60L 2240/662; B60L 53/54; B60L 53/63; B60L 55/00; B60L 58/13
USPC ........................................... 307/142
See application file for complete search history.

(56) References Cited

FOREIGN PATENT DOCUMENTS

| CN | 111682567 A | 9/2020 |
|---|---|---|
| JP | 2020-089147 A | 6/2020 |

*Primary Examiner* — Richard Tan
(74) *Attorney, Agent, or Firm* — Finnegan, Henderson, Farabow, Garrett & Dunner, LLP (57) ABSTRACT

A server that manages energy of a power grid by using a plurality of energy storage resources includes a loss obtaining unit and a selector. The loss obtaining unit obtains for each of the plurality of energy storage resources, energy loss including retention loss and input and output loss, the energy loss being caused in storing energy in each energy storage resource. When surplus electric power occurs in the power grid, the selector selects at least one energy storage resource for storing surplus electric power from among the plurality of energy storage resources based on the energy loss caused in storing surplus electric power.

11 Claims, 8 Drawing Sheets

FIG.7 《NEXT DAY: FINE》

FIG.8 《NEXT DAY: CLOUDY》

SERVER AND POWER MANAGEMENT METHOD

BACKGROUND

This nonprovisional application is based on Japanese Patent Application No. 2021-014340 filed with the Japan Patent Office on Feb. 1, 2021, the entire contents of which are hereby incorporated by reference.

Field

The present disclosure relates to a server that manages energy by using a plurality of energy storage resources and a power management method.

Description of the Background Art

Japanese Patent Laying-Open No. 2020-089147 discloses a power management method in which a facility is charged with surplus electric power (excess electric power without being used, of generated electric power). According to the power management method described in Japanese Patent Laying-Open No. 2020-089147, in selecting a facility for which suppression of charging power is requested by demand response (DR), a facility small in allowable amount of suppression is excluded from selection candidates.

SUMMARY

In storing surplus electric power in an energy storage resource (for example, a battery), energy loss may be caused while electric power is retained. For example, during a period for which electric power is stored in a battery, electric power is emitted little by little from the battery by self-discharge. Energy loss caused while energy is retained in an energy storage resource is also referred to as "retention loss" below.

Energy loss may be caused in both of input of energy into the energy storage resource and output of energy from the energy storage resource. For example, in storing electric power as being converted to hydrogen, energy loss is caused at the time of conversion. Alternatively, when hydrogen is used as being converted to electric power as well, energy loss is caused at the time of conversion. Energy loss caused in input of energy into the energy storage resource is also referred to as "input loss" below. Energy loss caused in output of energy from the energy storage resource is also referred to as "output loss." The sum of input loss and output loss is also referred to as "input and output loss." The sum of retention loss and input and output loss is also referred to as "total loss."

According to the power management method described in Japanese Patent Laying-Open No. 2020-089147, after surplus electric power is stored in a facility (energy storage resource), total loss in that facility may increase.

The present disclosure was made to solve the problem above, and an object thereof is to store surplus electric power with less energy loss.

The server according to the present disclosure is configured to manage energy of a power grid by using a plurality of energy storage resources. The server includes a loss obtaining unit and a selector. The loss obtaining unit is configured to obtain for each of the plurality of energy storage resources, energy loss including retention loss and input and output loss, the energy loss being caused in storing energy in each energy storage resource. The selector is configured to select, when surplus electric power occurs in the power grid, at least one energy storage resource for storing the surplus electric power from among the plurality of energy storage resources, based on the energy loss caused in storing the surplus electric power.

The server selects the energy storage resource for storing surplus electric power based on energy loss (including retention loss and input and output loss) caused in storing surplus electric power. According to the server, surplus electric power can be stored with less energy loss.

The energy storage resource is configured to store electric power therein. Any storage method is applicable. The energy storage resource may store electric power (electric energy) as it is, or may convert electric power into another type of energy (for example, liquid fuel or gaseous fuel as an energy source) and store resultant energy.

The loss obtaining unit is configured to predict, when the surplus electric power occurs in the power grid, a retention period (a period during which the surplus electric power is retained in an energy storage resource in storing the surplus electric power in the energy storage resource) for each of the plurality of energy storage resources and to obtain the retention loss based on the predicted retention period.

Retention loss (that is, energy loss caused while energy is retained in the energy storage resource) increases as the retention period is longer. According to the configuration, retention loss is more readily calculated with high accuracy.

The plurality of energy storage resources may include at least one of a stationary power storage and a stationary fuel cell. The loss obtaining unit may be configured to predict a supply sufficiency period (a period from occurrence of the surplus electric power in the power grid until demand electric power of the power grid exceeds supply electric power of the power grid) and to obtain the retention period in at least one of the stationary power storage and the stationary fuel cell based on the predicted supply sufficiency period.

When demand electric power of the power grid exceeds supply electric power of the power grid, energy stored in each of the stationary power storage and the stationary fuel cell is highly likely to be emitted for meeting the demand. Therefore, the retention period of each of the stationary power storage and the stationary fuel cell is expected to be longer as the supply sufficiency period is longer. According to the configuration, the retention period of at least one of the stationary power storage and the stationary fuel cell is more readily found with high accuracy.

The power grid may be configured to supply electric power to a plurality of houses. The power grid may be configured to receive supply of electric power from a variable renewable energy source (that is, a power supply in which power generation output varies depending on a meteorological condition). The loss obtaining unit may be configured to predict the demand electric power and the supply electric power of the power grid based on meteorological prediction information.

Demand electric power of the power grid is varied depending on an operating condition of an air-conditioning facility in a house. The loss obtaining unit more readily predicts demand electric power of the power grid with high accuracy by using meteorological prediction information (for example, information on a predicted air temperature). Supply electric power of the power grid is varied depending on a meteorological condition. The loss obtaining unit more readily predicts supply electric power of the power grid with high accuracy by using meteorological prediction information (for example, weather forecast information).

Examples of the variable renewable energy source include a photovoltaic power generation facility and a wind power generation facility. Since electric power is generated in the variable renewable energy source by using renewable energy, carbon dioxide emission can be reduced by securing at least some electric power of the power grid by using the variable renewable energy source.

The plurality of energy storage resources may include a vehicle including a power storage connectable to a power feed facility outside the vehicle. The loss obtaining unit may be configured to predict the retention period of the vehicle based on a travel plan of the vehicle.

Electric power stored in the power storage included in the vehicle is highly likely to be emitted for travel as the vehicle starts traveling. According to the configuration, the previously-described retention period of the vehicle including the power storage is more readily predicted with high accuracy. Examples of the vehicle including the power storage include a battery electric vehicle (BEV) and a plug-in hybrid electric vehicle (PREY).

The plurality of energy storage resources may include a hydrogen station configured to supply hydrogen to a fuel cell electric vehicle. The loss obtaining unit may be configured to predict hydrogen addition timing of the fuel cell electric vehicle based on a remaining amount of hydrogen and a travel plan of the fuel cell electric vehicle and to predict the retention period of the hydrogen station based on the predicted hydrogen addition timing.

A fuel cell electric vehicle (FCEV) may consume hydrogen by traveling, and when a remaining amount of hydrogen decreases, the FCEV may add hydrogen at a hydrogen station. According to the configuration, the previously-described retention period of the hydrogen station is more readily predicted with high accuracy.

The selector may be configured to select the at least one energy storage resource for storing the surplus electric power in the ascending order of the energy loss (including retention loss and input and output loss) caused in storing the surplus electric power. According to such a configuration, surplus electric power is stored with less energy loss.

The selector may be configured to select, when there is an energy storage resource insufficient in remaining amount of energy among the plurality of energy storage resources, an energy storage resource insufficient in remaining amount of energy as the at least one energy storage resource for storing the surplus electric power and to select, when there is no energy storage resource insufficient in remaining amount of energy among the plurality of energy storage resources, the at least one energy storage resource for storing the surplus electric power in the ascending order of energy loss caused in storing the surplus electric power.

Depending on an energy storage resource, when a remaining amount of energy is too small, functions thereof may be lowered or deterioration may be accelerated. With the server, surplus electric power can be stored preferentially in the energy storage resource insufficient in remaining amount of energy. Too small a remaining amount of energy in the energy storage resource can thus be suppressed. With the server, when there is no energy storage resource insufficient in remaining amount of energy, surplus electric power can be stored preferentially in the energy storage resource small in energy loss (including retention loss and input and output loss) caused in storing surplus electric power.

The selector may be configured to obtain the remaining amount of energy for each area. The selector may be configured to limit, when there is an area insufficient in remaining amount of energy, a candidate for the energy storage resource for storing the surplus electric power to energy storage resources present in the area insufficient in remaining amount of energy.

A remaining amount of reserve energy (that is, a remaining amount of energy that is desirably always stored) for emergency (for example, disasters) may be determined for each area. According to the server, surplus electric power can be stored preferentially in the energy storage resource located in the area insufficient in remaining amount of energy. Too small a remaining amount of energy in the area can thus be suppressed.

Any server described above may further include a storage control unit that controls the plurality of energy storage resources such that the surplus electric power is stored in the at least one energy storage resource selected by the selector. The server including such a storage control unit can select the energy storage resource and can have surplus electric power stored in the selected energy storage resource when surplus electric power occurs in the power grid.

A power management method according to the present disclosure is a method of managing electric power of a power grid by using a plurality of energy storage resources electrically connectable to the power grid. The power management method includes obtaining energy loss including retention loss and input and output loss for each of the plurality of energy storage resources when surplus electric power occurs in the power grid, the energy loss being caused in storing energy in each energy storage resource, and selecting at least one energy storage resource for storing the surplus electric power from among the plurality of energy storage resources, based on the obtained energy loss.

According to the power management method as well, similarly to the server described previously, surplus electric power can be stored with less energy loss.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail with reference to the drawings. The same or corresponding elements in the drawings have the same reference characters allotted and description thereof will not be repeated. An energy management system is denoted as "EMS" below. A distributed energy resource is denoted as "DEW".

Figure 1:
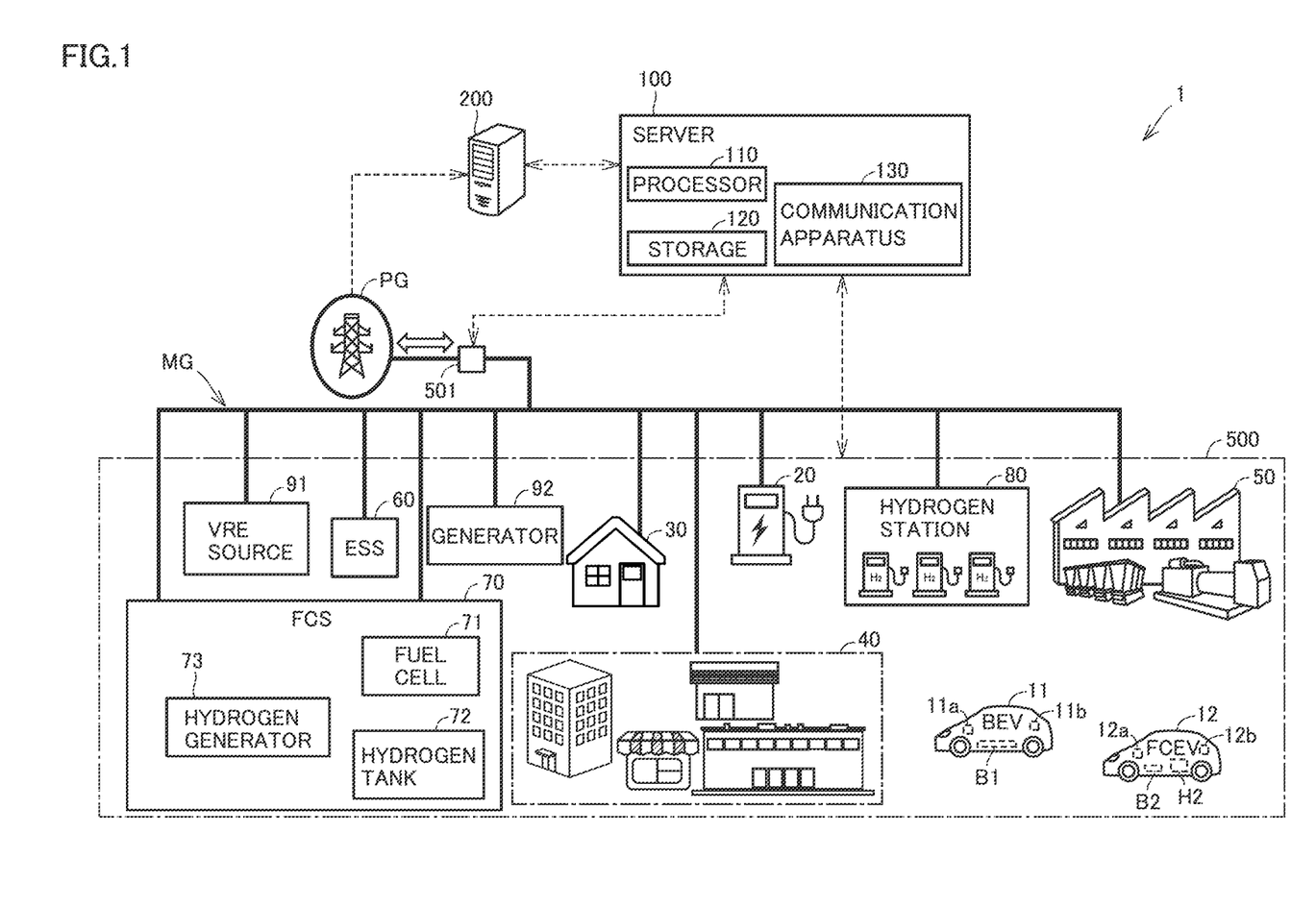
FIG. 1 is a diagram showing a schematic configuration of an electric power system according to an embodiment of the present disclosure.

FIG. 1 is a diagram showing a schematic configuration of an electric power system according to an embodiment of the present disclosure. Referring to FIG. 1, an electric power system 1 includes a power grid PG, a microgrid MG, servers 100 and 200, a DER group 500, and a power reception and transformation facility 501.

Server 100 is a computer that manages supply and demand of microgrid MG. Server 100 belongs to a manager of microgrid MG. Server 100 corresponds to a community EMS (CEMS) server. Microgrid MG is a power network that supplies electric power to one city (for example, a smart city) as a whole. A power line for networking a plurality of DERs in microgrid MG may be a private power line. Microgrid MG is configured to be connected to and disconnected from power grid PG. Microgrid MG corresponds to an exemplary "power grid" according to the present disclosure.

Power reception and transformation facility 501 is provided at a point of interconnection (a power reception point) of microgrid MG and configured to switch between parallel in (connection) and parallel off (disconnection) between power grid PG and microgrid MG. When microgrid MG is performing a grid-connected operation as being connected to power grid PG, power reception and transformation facility 501 receives alternating-current (AC) power from power grid PG, down-converts received electric power, and supplies down-converted electric power to microgrid MG. While microgrid MG is performing an isolated operation as being disconnected from power grid PG, electric power is not supplied from power grid PG to microgrid MG. Power reception and transformation facility 501 includes a switch on a high voltage side (a primary side) (for example, a section switch, an isolator, a breaker, and a load break switch), a transformer, a protection relay, a measurement instrument, and a controller. Server 100 is configured to receive information (for example, a power waveform) on microgrid MG from power reception and transformation facility 501 and to indicate parallel in/parallel off to power reception and transformation facility 501.

Server 200 is a computer that manages supply and demand of power grid PG. Power grid PG is a power grid constructed by a power plant and a power transmission and distribution (T&D) facility that are not shown. The electric power company corresponds to a general power T&D utility and maintains and manages power grid PG (commercial power supply). The electric power company corresponds to a manager of power grid PG. Server 200 belongs to the electric power company.

Server 100 is configured to communicate with each of server 200 and DER group 500. A protocol of communication may be OpenADR. DER group 500 includes a plurality of DERs electrically connectable to microgrid MG. Server 100 is configured to manage the plurality of DERs included in DER group 500. Server 100 may carry out demand response (DR) on DER group 500 when it is requested by server 200 to adjust supply and demand of power grid PG. Alternatively, server 100 may carry out DR on DER group 500 in response to a request from a supply and demand adjustment market. Alternatively, server 100 may carry out DR on DER group 500 in order to adjust supply and demand of microgrid MG.

The plurality of DERs included in DER group 500 are electrically connected to one another through microgrid MG. DER group 500 includes electric vehicle supply equipment (EVSE) 20, a house 30, a commercial facility 40, a factory 50, an energy storage system (ESS) 60, a fuel cell system (FCS) 70, a hydrogen station 80, a variable renewable energy source 91, and a generator 92. Each of these may function as a DER.

DER group 500 further includes a battery electric vehicle (BEV) 11 and a fuel cell electric vehicle (FCEV) 12. EVSE 20 functions as the DER as being electrically connected to a vehicle (for example, BEV 11). For example, as a charging connector of EVSE 20 is inserted (plugged) into an inlet of BEV 11, EVSE 20 and BEV 11 are electrically connected to each other. Though FIG. 1 shows only a single BEV 11 and only a single FCEV 12, any number of vehicles may be included in DER group 500. Ten or more or one hundred or more vehicles may be included. DER group 500 may include a POV or a MaaS vehicle. The POV is a personally owned vehicle. The MaaS vehicle is a vehicle managed by a mobility as a service (MaaS) entity.

Any number of pieces of EVSE 20, houses 30, commercial facilities 40, factories 50, ESSs 60, FCSs 70, hydrogen stations 80, variable renewable energy sources 91, and generators 92 may also be included in DER group 500. In this embodiment, a large number of pieces of EVSE 20, houses 30, commercial facilities 40, factories 50, ESSs 60, FCSs 70, hydrogen stations 80, variable renewable energy sources 91, and generators 92 are provided in one city.

BEV 11 includes a power storage B1. Power storage B1 is configured as being connectable to a power feed facility (for example, EVSE 20) outside the vehicle. Electric power stored in power storage B1 is used for driving a motor (not shown) for travel of BEV 11 or consumed in equipment mounted on BEV 11. FCEV 12 includes a power generation device H2 and a power storage B2. Power generation device H2 includes a hydrogen tank in which hydrogen is retained and a fuel cell that generates electric power by chemical reaction between hydrogen and oxygen (neither of which is shown). The fuel cell generates electric power by using hydrogen supplied from the hydrogen tank. Electric power generated by power generation device H2 is used for driving a motor (not shown) for travel of FCEV 12, consumed in equipment mounted on FCEV 12, or stored in power storage B2. A user of FCEV 12 can add hydrogen at hydrogen station 80 provided in the city. BEV 11 and FCEV 12 include electronic control units (ECUs) 11a and 12a and communication apparatuses 11b and 12b for wireless communication with server 100, respectively.

ESS 60 is a stationary power storage configured to be chargeable from and dischargeable to microgrid MG. For example, a lithium ion battery, a lead-acid battery, a nickel metal hydride battery, a redox flow battery, or a sodium sulfur (NAS) battery may be adopted as ESS 60.

FCS 70 includes a stationary fuel cell 71 that generates electric power by chemical reaction between hydrogen and oxygen, a hydrogen tank 72, and a hydrogen generator 73. Fuel cell 71 is connected to hydrogen tank 72 that is connected to hydrogen generator 73. Fuel cell 71 is configured to generate electric power by using hydrogen supplied from hydrogen tank 72 and to supply generated electric power to microgrid MG. Hydrogen generator 73 generates hydrogen and supplies generated hydrogen to hydrogen tank 72. Any method can be adopted as a hydrogen generation method. For example, such a known method as a by-product hydrogen method, water electrolysis, a fossil fuel reforming method, a biomass reforming method, or an iodine-sulfur (IS) process may be adopted for hydrogen generator 73. Hydrogen generator 73 is configured to generate hydrogen by using electric power supplied from microgrid MG.

DER group 500 includes a plurality of pieces of EVSE 20 and a plurality of hydrogen stations 80 as an infrastructure provided in the city. Microgrid MG and EVSE 20 are connected to each other to supply and receive electric power to and from each other. Hydrogen station 80 is basically configured similarly to FCS 70. In other words, hydrogen station 80 includes a stationary fuel cell, a hydrogen tank, and a hydrogen generator. Hydrogen station 80 is configured to generate hydrogen by using electric power supplied from microgrid MG. Hydrogen station 80 is configured to supply hydrogen to FCEV 12.

Each of EVSE 20 and hydrogen station 80 is a public facility that can be used by a user of a vehicle after prescribed authentication. An authentication method may be authentication by a charging card or authentication by communication (for example, Plug and Charge). A user of BEV 11 connects BEV 11 to EVSE 20 through a cable and thereafter operates at least one of BEV 11 and EVSE 20 so as to supply electric power from EVSE 20 to BEV 11. A user of FCEV 12 connects FCEV 12 to hydrogen station 80 through a cable and thereafter operates at least one of FCEV 12 and hydrogen station 80 so as to supply hydrogen from hydrogen station 80 to FCEV 12. Server 100 and each of EVSE 20 and hydrogen station 80 are configured to communicate with each other. Server 100 can identify a user who uses EVSE 20 and hydrogen station 80 by authentication.

DER group 500 includes a plurality of houses 30 (for example, houses of people who live in the city). Microgrid MG is configured to supply electric power to the plurality of houses 30. House 30 includes various home electrical appliances (for example, a lighting device, an air-conditioning facility, kitchen equipment, information equipment, a television, a refrigerator, and a washing machine). House 30 may further include at least one of a charger-discharger (for example, home EVSE), a variable renewable energy source (for example, a photovoltaic panel provided on a roof), an ESS, an FCS, and a cogeneration system (for example, a water heater or a heat pump water heater that uses heat generated in self-generation). Supply and demand of energy in house 30 is managed, for example, by a not-shown home EMS (HEMS). In this embodiment, server 100 and each house 30 communicate with each other through the HEMS. Microgrid MG and each house 30 are connected to each other to supply and receive electric power therebetween.

DER group 500 includes commercial facility 40. Commercial facility 40 includes, for example, office buildings and stores. Examples of the stores include department stores, shopping centers, supermarkets, or convenience stores. Supply and demand of energy in each facility included in commercial facility 40 is managed, for example, by a not-shown building EMS (BEMS). The BEMS may manage supply and demand of energy individually for each facility or may collectively manage supply and demand of energy in a plurality of facilities. In this embodiment, server 100 communicates with commercial facility 40 through the BEMS. Each facility included in commercial facilities 40 and microgrid MG are connected to each other to supply and receive electric power therebetween.

DER group 500 includes a plurality of factories 50. Factory 50 may be, for example, a car factory or another factory. Factory 50 includes, for example, a production line and a concentrated heat source for air-conditioning. Factory 50 may include at least one of a variable renewable energy source (for example, a photovoltaic power generation facility or a wind power generation facility), a generator (for example, a gas turbine generator or a diesel generator), and a cogeneration system. Supply and demand of energy in factory 50 is managed, for example, by a not-shown factory EMS (FEMS). In this embodiment, server 100 and each factory 50 communicate with each other through the FEMS. Microgrid MG and factory 50 are connected to each other to supply and receive electric power therebetween.

DER group 500 includes a plurality of variable renewable energy sources 91. Variable renewable energy source 91 is a power supply that varies in power generation output depending on a meteorological condition, and it provides generated electric power to microgrid MG. Microgrid MG is configured to receive supply of electric power from variable renewable energy source 91. Electric power generated by variable renewable energy source 91 corresponds to variable renewable energy (VRE). Variable renewable energy source 91 includes, for example, a photovoltaic power generation facility and a wind power generation facility.

DER group 500 includes a plurality of generators 92. Generator 92 is a stationary generator that generates electric power by using fossil fuel. Generator 92 may be, for example, a gas turbine generator or a diesel generator. Generator 92 may be used as an emergency power supply.

Server 100 includes a processor 110, a storage 120, and a communication apparatus 130. Processor 110 may be implemented by a central processing unit (CPU). Storage 120 is configured to store various types of information. Storage 120 stores not only a program executed by processor 110 but also information (for example, a map, a mathematical expression, and various parameters) to be used by a program. Communication apparatus 130 includes various communication interfaces (I/Fs). Server 100 is configured to communicate with the outside through communication apparatus 130.

Server 100 controls DER group 500 connected to microgrid MG to function as a virtual power plant (VPP). More specifically, server 100 remotely controls DER group 500 as being integrated as if the DERs functioned as a single power plant according to an energy management technology that makes use of the Internet of Things (IoT).

Figure 2:
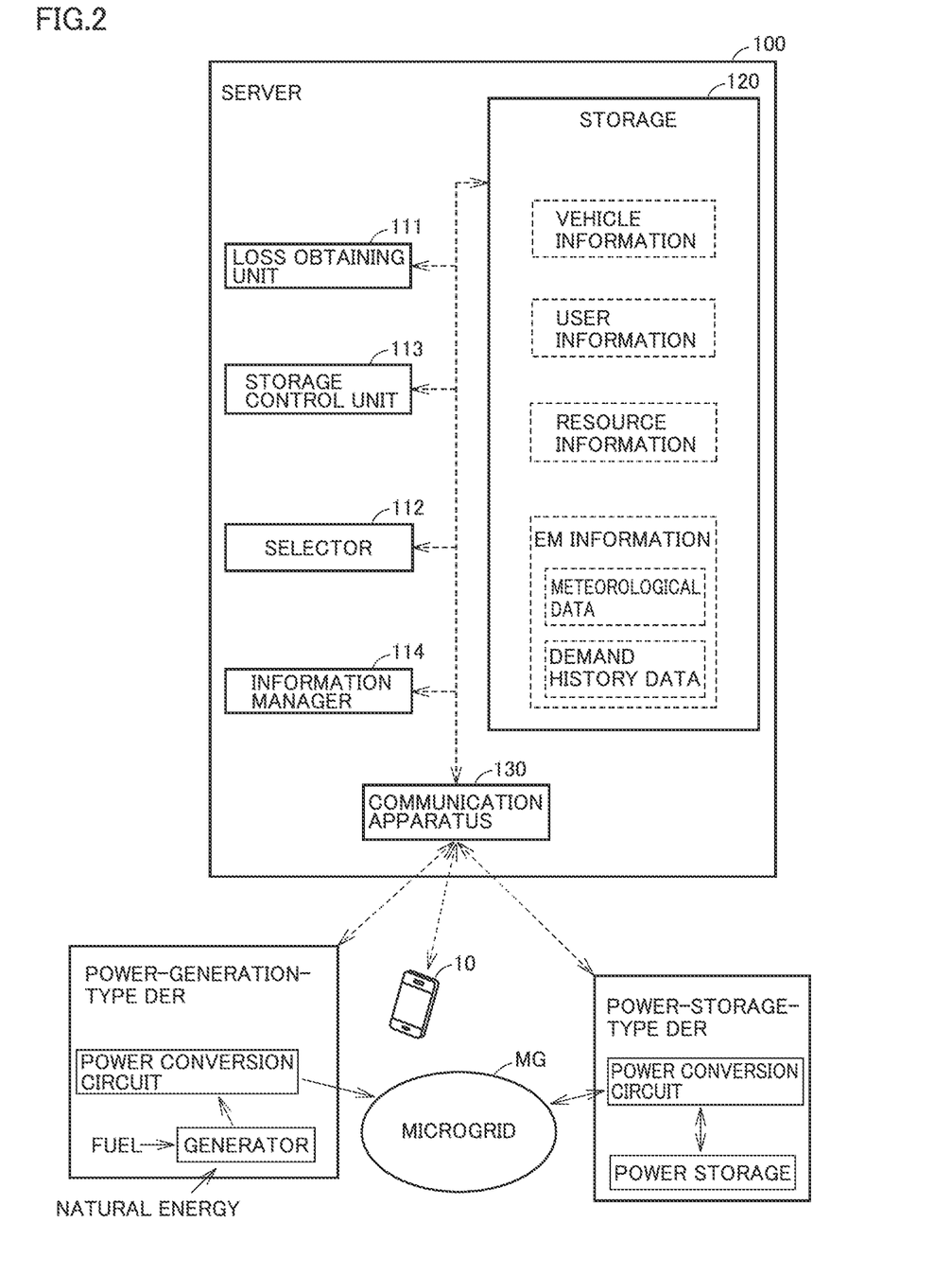
FIG. 2 is a functional block diagram showing a component of a server for each function according to the embodiment of the present disclosure.

FIG. 2 is a functional block diagram showing a component of server 100 for each function. Referring to FIG. 2 together with FIG. 1, server 100 includes a loss obtaining unit 111, a selector 112, a storage control unit 113, and an information manager 114. Each unit is implemented, for example, by processor 110 shown in FIG. 1 and a program in storage 120 executed by processor 110. Without being limited as such, each unit may be implemented by dedicated hardware (electronic circuitry). Server 100 according to this embodiment corresponds to an exemplary "server" according to the present disclosure.

Server 100 is configured to communicate with each of a portable terminal 10 and a DER through communication apparatus 130.

A user of each vehicle (including BEV 11 and FCEV 12) carries portable terminal 10. Though FIG. 2 shows only a single portable terminal 10, portable terminal 10 is carried by a user of each vehicle. In this embodiment, a smartphone equipped with a touch panel display is adopted as portable terminal 10. Without being limited thereto, any portable terminal can be adopted as portable terminal 10, and a tablet terminal, a wearable device (for example, a smart watch), an electronic key, or the like can also be adopted. Prescribed application software (which is simply referred to as an "application" below) is installed in portable terminal 10. Portable terminal 10 is configured to exchange information with server 100 through the application. The user can transmit a travel plan of a vehicle to server 100 by operating portable terminal 10. Examples of the travel plan of the vehicle include a drive plan (for example, time of departure, a destination, and time of arrival) of a POV or a drive plan of a MaaS vehicle.

Each DER included in DER group 500 is categorized into a power-generation-type DER, a power-storage-type DER, and a load-type DER.

In the power-generation-type DER, the generator generates electric power with natural energy (for example, solar rays or wind power) or fuel (for example, light oil, natural gas, or hydrogen) and generated electric power is provided to microgrid MG through a power conversion circuit. In the power-storage-type DER, electric power is exchanged between the power storage and microgrid MG through the power conversion circuit. The power conversion circuit in each DER is configured to operate in accordance with a control signal from server 100 and to carry out prescribed power conversion. The power conversion circuit may include at least one of an inverter and a converter. The power conversion circuit may include a relay that switches between connection and disconnection between a DER and microgrid MG.

For example, in DER group 500 shown in FIG. 1, ESS 60 functions as the power-storage-type DER. Each of FCS 70, variable renewable energy source 91, and generator 92 functions as the power-generation-type DER. Though electric power generated by variable renewable energy source 91 is basically determined by a meteorological condition, power generation output of variable renewable energy source 91 can be restricted.

BEV 11 functions as the power-storage-type DER. BEV 11 functions as the power-storage-type DER by carrying out charging and discharging of power storage B1 connected to microgrid MG. FCEV 12 functions as the power-generation-type DER. FCEV 12 functions as the power-generation-type DER by providing electric power generated by power generation device H2 to microgrid MG. FCEV 12 may be configured to function as the power-storage-type DER. When the capacity and charging and discharging performance of power storage B2 are sufficient, FCEV 12 can function also as the power-storage-type DER. The power conversion circuit may be mounted on a vehicle (BEV 11 or FCEV 12) or on EVSE 20. For example, direct-current (DC) power may be provided from the vehicle to EVSE 20 of the DC type and the inverter contained in EVSE 20 may carry out DC/AC conversion. The vehicle-mounted inverter may carry out DC/AC conversion on electric power discharged from the power storage included in the vehicle and resultant AC power may be provided from the vehicle to EVSE of the AC type.

Though not shown in FIG. 2, an electrical appliance that consumes electric power of microgrid MG can also function as the DER (the load-type DER). As electrical load of the electrical appliance connected to microgrid MG is higher, an amount of power consumption in microgrid MG is larger. For example, a demand side of each of house 30, commercial facility 40, and factory 50 shown in FIG. 1 can adjust supply and demand of microgrid MG by adjusting the electrical load of the electrical appliance. When power consumption in the electrical appliance connected to microgrid MG is suppressed, the electrical appliance serves for microgrid MG similarly to the generator. In other words, the electrical appliance (the load-type DER) can function as a virtual generator (power supply).

Information manager 114 is configured to manage information on each user (which is also referred to as "user information" below) registered in server 100, information on each vehicle (which is also referred to as "vehicle information" below) registered in server 100, and information on each stationary DER (which is also referred to as "resource information" below) registered in server 100. The user information, the vehicle information, and the resource information are stored in storage 120 as being distinguished for each user, for each vehicle, or for each DER based on identification information (ID).

The vehicle information includes vehicle specs, a position of the vehicle, input and output electric power, a remaining amount of energy, and a travel plan. The remaining amount of energy in BEV 11 includes a state of charge (SOC) of power storage B1. The remaining amount of energy in FCEV 12 includes a remaining amount of hydrogen in the hydrogen tank of power generation device H2.

The vehicle information further includes loss information for finding energy loss. Loss information of BEV 11 includes a self-discharge ratio of power storage B1 (that is, information indicating an amount of electric power emitted per unit time from the power storage that is being left stand) and an SOC/temperature/resistance map (that is, a map showing relation among the SOC, the temperature, and the electrical resistance) of power storage B1. Though details will be described later, loss obtaining unit 111 predicts input and output loss caused in storing surplus electric power in BEV 11, by referring to the SOC/temperature/resistance map of power storage B1. The self-discharge ratio of power storage B1 is used for finding retention loss of BEV 11. Loss information of FCEV 12 includes hydrogen/electric power conversion efficiency (that is, information indicating a ratio of energy lost in generation of electric power from hydrogen) of FCEV 12. When electric power system 1 includes a plurality of FCEVs different in vehicle type, the hydrogen/electric power conversion efficiency of each FCEV may be average hydrogen/electric power conversion efficiency of the plurality of FCEVs included in electric power system 1. Though details will be described later, loss obtaining unit 111 predicts output loss caused in storing surplus electric power in hydrogen station 80, by referring to the hydrogen/electric power conversion efficiency of FCEV 12.

A position and a state (for example, a temperature, input and output electric power, and a remaining amount of energy of the power storage) of the vehicle are obtained by various sensors mounted on each vehicle and transmitted from each vehicle to server 100. Each vehicle may sequentially transmit recent position and state of the vehicle every prescribed cycle or may collectively transmit accumulated data at prescribed timing (for example, at the time of end of travel). The travel plan is transmitted from portable terminal 10 to server 100. Server 100 may predict the travel plan of the vehicle based on history data of the vehicle. The self-discharge ratio, the SOC/temperature/resistance map, and the hydrogen/electric power conversion efficiency may be found in advance through experiments or simulations and stored in storage 120.

EVSE 20, house 30, commercial facility 40, factory 50, ESS 60, FCS 70, hydrogen station 80, variable renewable energy source 91, and generator 92 are registered in server 100 as stationary DERs. The resource information includes a position, specs, and input and output electric power of each stationary DER. The resource information of each of EVSE 20 and hydrogen station 80 further includes whether or not the vehicle is connected thereto. The resource information of each of EVSE 20, ESS 60, FCS 70, and hydrogen station 80 connected to BEV 11 further includes a remaining amount of energy. The remaining amount of energy in EVSE 20 connected to BEV 11 is represented by the SOC of power storage B1. The remaining amount of energy in ESS 60 is represented by the SOC of ESS 60. The remaining amount of energy in each of FCS 70 and hydrogen station 80 is represented by the remaining amount of hydrogen in the hydrogen tank. Server 100 can obtain the state (for example, input and output electric power and the remaining amount of energy) of each stationary DER through communication with each stationary DER.

The resource information of each of ESS 60, FCS 70, and hydrogen station 80 further includes loss information for finding energy loss. Loss information of ESS 60 includes the self-discharge ratio of ESS 60 and the SOC/temperature/resistance map of ESS 60. Loss information of FCS 70 includes a hydrogen leakage ratio (that is, information indicating, by conversion to an amount of electric power, an amount of hydrogen emitted per unit time from the hydrogen tank that is left stand) of hydrogen tank 72, electric power/hydrogen conversion efficiency (that is, information indicating a ratio of energy lost in generation of hydrogen from electric power) of hydrogen generator 73, and the hydrogen/electric power conversion efficiency of fuel cell 71. Loss information of hydrogen station 80 includes the hydrogen leakage ratio of the hydrogen tank and the electric power/hydrogen conversion efficiency of the hydrogen generator.

User information includes a communication address of portable terminal 10 carried by the user, a vehicle ID of the vehicle belonging to the user, and a resource ID of a stationary DER belonging to the user.

Furthermore, information manager 114 is configured to manage information on energy management (which is also referred to as "EM information" below). EM information is stored in storage 120 as being distinguished based on time. In this embodiment, EM information includes meteorological data and demand history data which will be described below.

Meteorological data includes a prediction value and an actual measurement value of meteorological information for each area. The meteorological information includes, for example, weather, an air temperature, intensity of solar radiation, and wind power. The weather is categorized, for example, into fine/cloudy/rainy/snowy. Information manager 114 may obtain the prediction value and the actual measurement value of the meteorological information by using a known meteorological service (for example, a service provided by a meteorological agency, an information technology company, or a communication company). Information manager 114 manages meteorological data as being distinguished based on a target area and time (time of measurement or time of prediction).

Demand history data may include a daily demand electric power profile (transition of demand electric power) of microgrid MG measured in the past. Demand electric power may be accumulated in storage 120 in association with time of measurement and meteorological data (for example, an air temperature). Information manager 114 may obtain the demand electric power profile from power reception and transformation facility 501. Demand electric power of microgrid MG may be measured by a wattmeter (not shown) provided in power reception and transformation facility 501 and accumulated in storage 120 in association with time of measurement. A data interval of the demand electric power profile may be equal to or shorter than ten minutes, may be set to approximately thirty minutes, or may be set to one to three hours. Demand history data may include, for example, data over past three years or data over more years.

Figure 3:
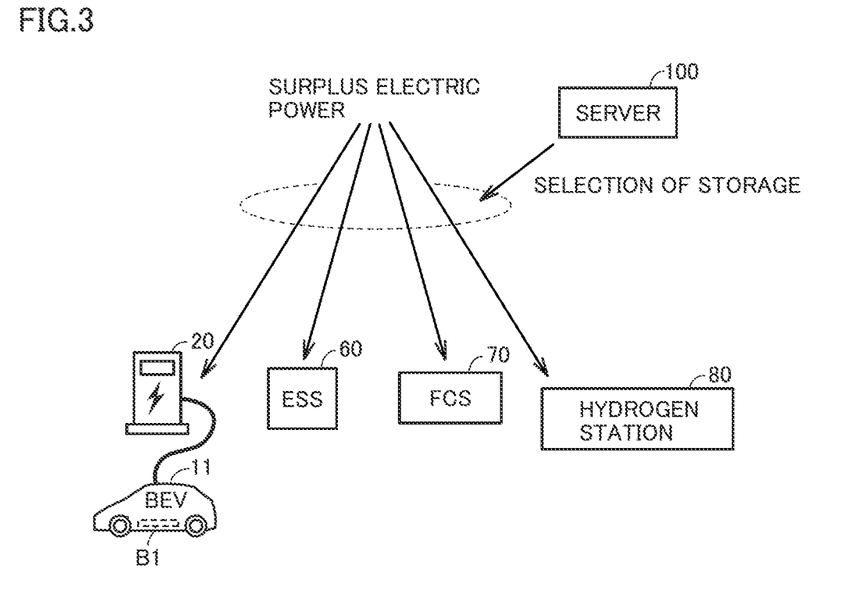
FIG. 3 is a diagram for illustrating an energy management method according to the embodiment of the present disclosure.

Server 100 is configured to manage energy of microgrid MG by using DER group 500. FIG. 3, together with FIGS. 1 and 2, is a diagram for illustrating an energy management method according to this embodiment. Referring to FIG. 3, server 100 selects where surplus electric power is to be stored from among EVSE 20 connected to BEV 11, ESS 60, FCS 70, and hydrogen station 80, for example, when surplus electric power occurs in microgrid MG owing to power generation in variable renewable energy source 91. EVSE 20 connected to BEV 11 may be denoted as "BEV-EVSE" below. In DER group 500, the BEV-EVSE can have electric power received from microgrid MG stored in power storage B1 of BEV 11. Electric power supplied from microgrid MG can be stored in ESS 60. Each of FCS 70 and hydrogen station 80 can convert electric power supplied from microgrid MG into hydrogen and can have hydrogen stored in the hydrogen tank. In this embodiment, each of EVSE 20 connected to BEV 11, ESS 60, FCS 70, and hydrogen station 80 included in DER group 500 corresponds to an exemplary "energy storage resource" according to the present disclosure.

Referring again to FIG. 2 together with FIG. 1, loss obtaining unit 111 is configured to obtain energy loss caused in storing energy in the DER, for each of the BEV-EVSE, ESS 60, FCS 70, and hydrogen station 80 included in DER group 500. Energy loss obtained by loss obtaining unit 111 is total loss. In storing energy in the DER, energy loss (that is, retention loss) is caused while energy is retained in the DER. Energy loss (that is, input and output loss) is caused at the time of input and output of energy stored in the DER. Total loss is the sum of retention loss and input and output loss.

In this embodiment, loss obtaining unit 111 is configured to predict the retention period for each of the BEV-EVSE, ESS 60, FCS 70, and hydrogen station 80 included in DER group 500 when surplus electric power occurs in microgrid MG. The retention period predicted by loss obtaining unit 111 is a period during which surplus electric power is retained in the DER in storing surplus electric power in the DER. As the retention period is longer, retention loss is larger.

Loss obtaining unit 111 is configured to obtain retention loss of each of the BEV-EVSE, ESS 60, FCS 70, and hydrogen station 80 based on the predicted retention period. Loss obtaining unit 111 is configured to obtain input and output loss of each of the BEV-EVSE, ESS 60, FCS 70, and hydrogen station 80 based on loss information in storage 120. Then, loss obtaining unit 111 is configured to find total loss of each of the BEV-EVSE, ESS 60, FCS 70, and hydrogen station 80 by adding retention loss and input and output loss to each other.

Selector 112 is configured to select a DER for storing surplus electric power from DER group 500 based on total loss predicted as above. More specifically, selector 112 is configured to select a DER for storing surplus electric power in the ascending order of total loss.

Storage control unit 113 controls DER group 500 such that surplus electric power is stored in at least one DER selected by selector 112. Storage control unit 113 controls the power conversion circuit of each DER included in DER group 500, for example, such that surplus electric power of microgrid MG is stored only in the DER selected by selector 112.

Figure 4:
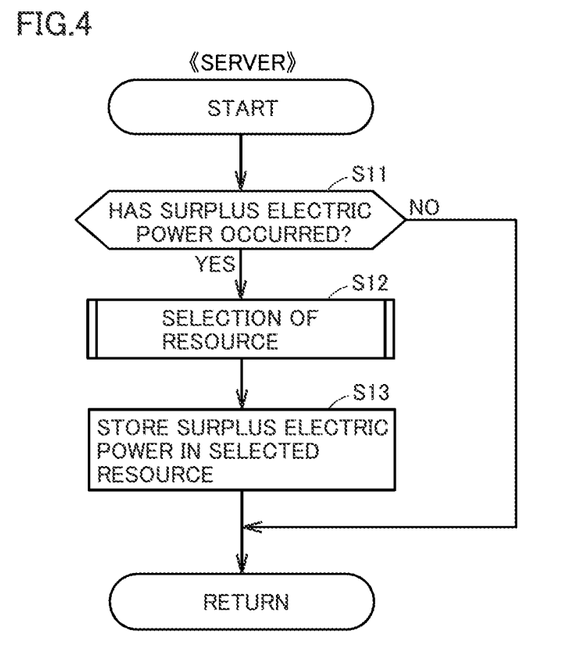
FIG. 4 is a flowchart for illustrating processing involved with energy management performed by the server shown in FIG. 2.

FIG. 4 is a flowchart for illustrating processing involved with energy management performed by server 100. Processing shown in this flowchart is repeatedly performed, for example, in prescribed cycles.

Referring to FIG. 4 together with FIGS. 1 and 2, in step (which is simply denoted as "S" below) 11, selector 112 determines whether or not surplus electric power occurs in microgrid MG. For example, when power generation output of variable renewable energy source 91 dependent on a meteorological condition increases, supply electric power of microgrid MG may exceed demand electric power of microgrid MG. While determination as NO (no surplus electric power occurring) is made in S11, processing in S11 is repeated. When determination as YES (surplus electric power occurring) is made in S11, the process proceeds to a next step (S12).

Figure 5:
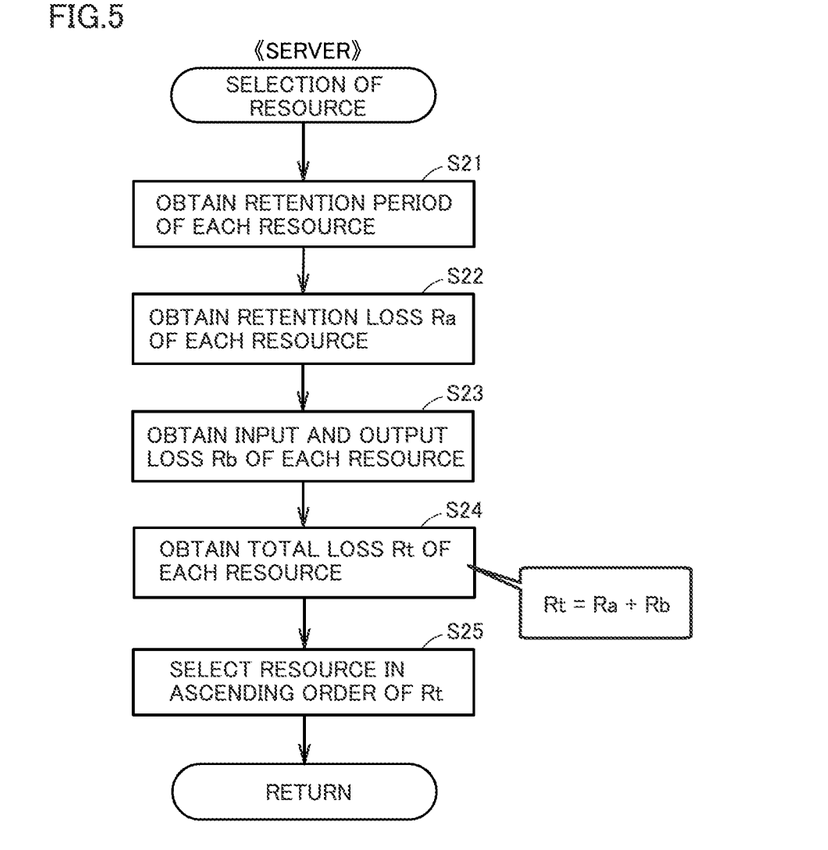
FIG. 5 is a flowchart showing processing involved with selection of an energy storage resource performed by the server shown in FIG. 2.

In S12, processing shown in FIG. 5 which will be described below is performed. FIG. 5 is a flowchart showing processing involved with selection of a DER performed by server 100. Referring to FIG. 5 together with FIGS. 1 and 2, loss obtaining unit 111 obtains total loss of each of the BEV-EVSE, ESS 60, FCS 70, and hydrogen station 80 included in DER group 500 through processing in S21 to S24.

Figure 6:
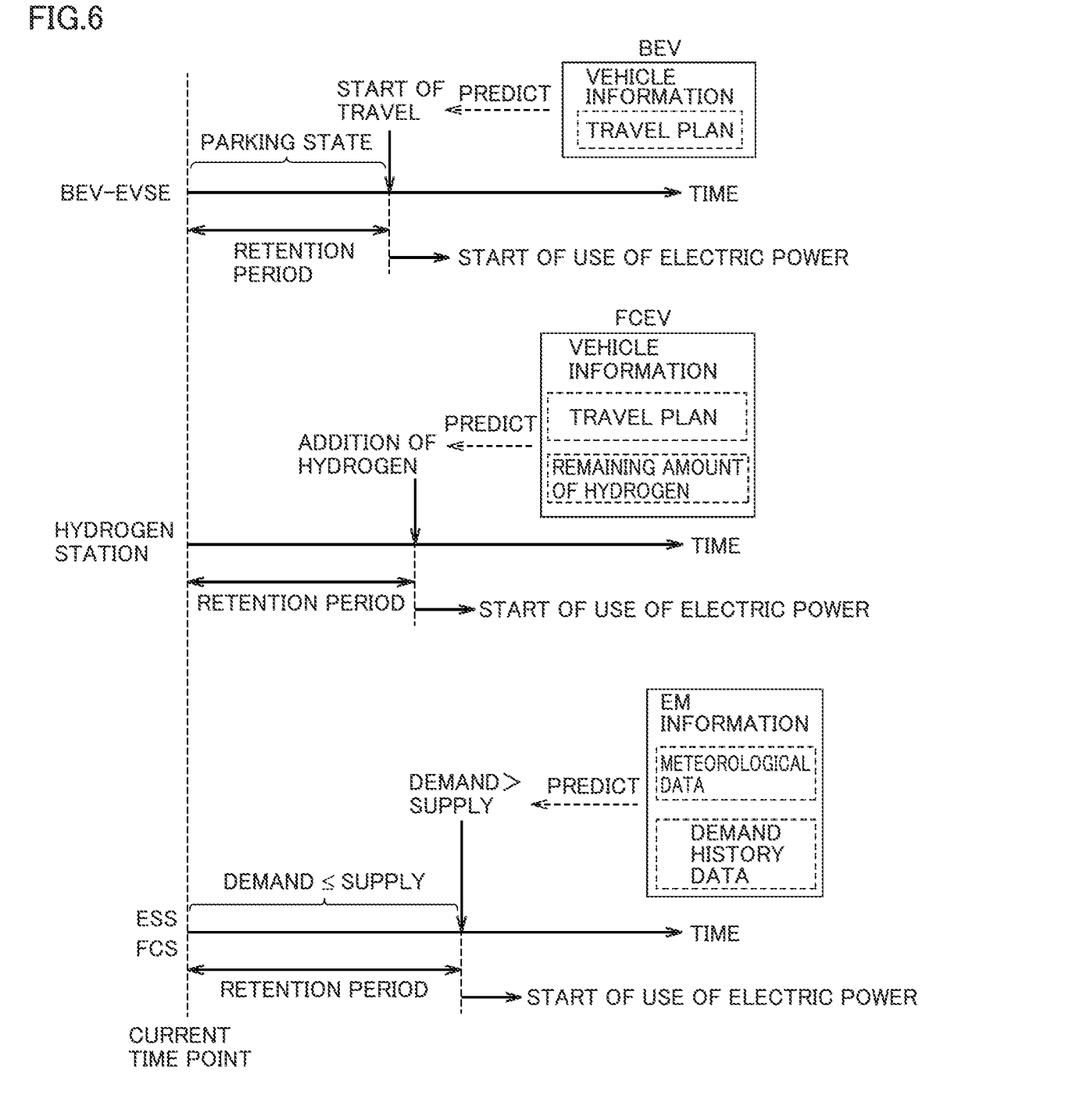
FIG. 6 is a diagram for illustrating processing for predicting a retention period performed by the server shown in FIG. 2.

In S21, loss obtaining unit 111 predicts the retention period of each of the BEV-EVSE, ESS 60, FCS 70, and hydrogen station 80 included in DER group 500. FIG. 6 is a diagram for illustrating processing for predicting the retention period (S21).

Referring to FIG. 6 together with FIGS. 1 and 2, loss obtaining unit 111 predicts the retention period of the BEV-EVSE based on the travel plan of BEV 11. Electric power stored in power storage B1 included in BEV 11 is highly likely to be emitted for travel as BEV 11 starts traveling. Loss obtaining unit 111 according to this embodiment defines a period from the current time point (that is, timing of occurrence of surplus electric power in microgrid MG) until start of travel of BEV 11 as the retention period of the BEV-EVSE.

Loss obtaining unit 111 predicts hydrogen addition timing of FCEV 12 based on the remaining amount of hydrogen and the travel plan of FCEV 12, and predicts the retention period of hydrogen station 80 based on the predicted hydrogen addition timing. FCEV 12 consumes hydrogen by travel, and addition of hydrogen thereto at hydrogen station 80 is expected when the remaining amount of hydrogen in the hydrogen tank of power generation device H2 decreases. Therefore, loss obtaining unit 111 can predict the hydrogen addition timing (that is, timing when hydrogen is added to FCEV 12 at hydrogen station 80) of FCEV 12 based on the remaining amount of hydrogen and the travel plan of FCEV 12. Hydrogen stored in hydrogen station 80 is emitted for supplying hydrogen to FCEV 12. Loss obtaining unit 111 according to this embodiment defines a period from the current time point until the hydrogen addition timing of FCEV 12 as the retention period of hydrogen station 80.

Loss obtaining unit 111 predicts a supply sufficiency period of microgrid MG (that is, a period from occurrence of surplus electric power in microgrid MG until demand electric power of microgrid MG exceeds supply electric power) and obtains the retention period of each of ESS 60 and FCS 70 based on the predicted supply sufficiency period. Energy stored in each of ESS 60 and FCS 70 is highly likely to be emitted for meeting demand when demand electric power of microgrid MG exceeds supply electric power. Therefore, the retention period of each of ESS 60 and FCS 70 is expected to be longer as the supply sufficiency period is longer. In this embodiment, ESS 60 and FCS 70 correspond to an exemplary "stationary power storage" and an exemplary "stationary fuel cell" according to the present disclosure, respectively.

Loss obtaining unit 111 predicts a demand electric power profile (transition of demand electric power) on the next day of microgrid MG based on meteorological data and demand history data. For example, loss obtaining unit 111 can predict the demand electric power profile on the next day of microgrid MG based on demand history data (for example, demand electric power in the same time of the previous year). Furthermore, loss obtaining unit 111 may predict an operating condition of an air-conditioning facility based on meteorological data (for example, a prediction value of an air temperature). Then, loss obtaining unit 111 may correct the demand electric power profile on the next day of microgrid MG predicted from the demand history data based on the predicted operating condition of the air-conditioning facility. For example, when the air temperature on the next day is expected to be higher than the air temperature in the same time of the previous year and a larger number of houses 30, commercial facilities 40, and factories 50 are expected to turn on the air-conditioning facilities, loss obtaining unit 111 may correct the prediction value of demand electric power on the next day of microgrid MG to increase. Loss obtaining unit 111 may predict demand based on at least one of meteorological prediction (for example, end of rainy season) for one week and meteorological prediction (for example, cold summer) for several months.

Loss obtaining unit 111 predicts a generated electric power profile (transition of generated electric power) on the next day of variable renewable energy source 91 based on meteorological data (for example, weather, intensity of solar radiation, and wind power). For example, loss obtaining unit 111 can predict a photovoltaically generated electric power profile on the next day of variable renewable energy source 91 based on weather forecast and the prediction value of intensity of solar radiation. Loss obtaining unit 111 can predict a wind generated electric power profile on the next day of variable renewable energy source 91 based on weather forecast and a prediction value of wind power.

Loss obtaining unit 111 may predict timing when demand electric power of microgrid MG exceeds supply electric power based on the demand electric power profile and the generated electric power profile on the next day predicted as above. When a state that supply electric power of microgrid MG exceeds demand electric power continues until the day after the next day, loss obtaining unit 111 may predict timing when demand electric power of microgrid MG exceeds supply electric power also based on more distant future prediction data (for example, the demand electric power profile and the generated electric power profile on the day after the next day). Loss obtaining unit 111 defines the supply sufficiency period of microgrid MG predicted as above as the retention period of each of ESS 60 and FCS 70.

Referring again to FIG. 5 together with FIGS. 1 and 2, in S22, loss obtaining unit 111 obtains retention loss Ra of each of the BEV-EVSE, ESS 60, FCS 70, and hydrogen station 80 based on the retention period predicted in S21 and loss information in storage 120. In S23, loss obtaining unit 111 obtains input and output loss Rb of each of the BEV-EVSE, ESS 60, FCS 70, and hydrogen station 80 based on loss information in storage 120. In S24, loss obtaining unit 111 obtains total loss Rt of each of the BEV-EVSE, ESS 60, FCS 70, and hydrogen station 80 by adding retention loss Ra and input and output loss Rb to each other.

More specifically, loss obtaining unit 111 obtains loss information (including the self-discharge ratio of power storage B1) from storage 120 and predicts the product of the self-discharge ratio of power storage B1 and the retention period of BEV 11 as retention loss Ra of the BEV-EVSE (S22). Loss obtaining unit 111 obtains loss information (including the SOC/temperature/resistance map) from storage 120 and calculates an electrical resistance of power storage B1 corresponding to the SOC and the temperature of power storage B1 based on the SOC/temperature/resistance map of power storage B1. Loss obtaining unit 111 calculates input loss of the BEV-EVSE in accordance with an expression "input loss=$I_{in} \times I_{in} \times R_{in}$" ($I_{in}$: input current, $R_{in}$: electrical resistance at the time of input), and calculates output loss of the BEV-EVSE in accordance with an expression "output loss=$I_{out} \times I_{out} \times R_{out}$" ($I_{out}$: output current, $R_{out}$: electrical resistance at the time of output). Each of $I_{in}$ and $I_{out}$ may be a prescribed value or an average value of past input and output data. Loss obtaining unit 111 predicts the sum of input loss and output loss obtained as above, as input and output loss Rb of the BEV-EVSE (S23). Then, loss obtaining unit 111 predicts the sum of retention loss Ra and input and output loss Rb of the BEV-EVSE obtained as above, as total loss Rt of the BEV-EVSE (S24).

Loss obtaining unit 111 predicts the product of the self-discharge ratio of ESS 60 and the retention period of ESS 60 as retention loss Ra of ESS 60, similarly to the BEV-EVSE described above (S22). Loss obtaining unit 111 calculates input loss and output loss of ESS 60 with a method similar to that of the BEV-EVSE. Loss obtaining unit 111 predicts the sum of obtained input loss and output loss as input and output loss Rb of ESS 60 (S23). Then, loss obtaining unit 111 predicts the sum of retention loss Ra and input and output loss Rb of ESS 60 obtained as above, as total loss Rt of ESS 60 (S24).

Loss obtaining unit 111 obtains loss information (including the hydrogen leakage ratio) from storage 120 and predicts the product of the hydrogen leakage ratio of hydrogen tank 72 and the retention period of FCS 70 as retention loss Ra of FCS 70 (S22). The hydrogen leakage ratio is lower than the self-discharge ratio. Loss obtaining unit 111 calculates input loss of FCS 70 based on the electric power/hydrogen conversion efficiency of hydrogen generator 73. Loss obtaining unit 111 calculates output loss of FCS 70 based on the hydrogen/electric power conversion efficiency of fuel cell 71. Loss obtaining unit 111 predicts the sum of obtained input loss and output loss as input and output loss Rb of FCS 70 (S23). Then, loss obtaining unit 111 predicts the sum of retention loss Ra and input and output loss Rb of FCS 70 obtained as above, as total loss Rt of FCS 70 (S24). Input and output loss Rb of FCS 70 is larger than input and output loss Rb of ESS 60.

Loss obtaining unit 111 predicts the product of the hydrogen leakage ratio of the hydrogen tank of hydrogen station 80 and the retention period of hydrogen station 80 as retention loss of hydrogen station 80 (S22), similarly to FCS 70 described above. Loss obtaining unit 111 calculates input loss of hydrogen station 80 based on the electric power/hydrogen conversion efficiency of the hydrogen generator of hydrogen station 80. Loss obtaining unit 111 calculates output loss of hydrogen station 80 based on the hydrogen/electric power conversion efficiency of FCEV 12. Loss obtaining unit 111 predicts the sum of obtained input loss and output loss as input and output loss Rb of hydrogen station 80 (S23). Then, loss obtaining unit 111 predicts the sum of retention loss Ra and input and output loss Rb of hydrogen station 80 obtained as above, as total loss Rt of hydrogen station 80 (S24). Input and output loss Rb of hydrogen station 80 is larger than input and output loss Rb of the BEV-EVSE.

The relational expression for calculating each of retention loss and input and output loss is not limited to the above. Loss obtaining unit 111 may correct the relational expression based on past records. Loss obtaining unit 111 may sequentially update the relational expression based on statistical data (for example, big data) by machine learning.

In S25, selector 112 selects DERs in number necessary for storing surplus electric power from among the BEV-EVSE, ESS 60, FCS 70, and hydrogen station 80 included in DER group 500. Selector 112 makes selection of DERs in the ascending order of total loss Rt predicted in processing in S21 to S24. Total loss Rt of each of ESS 60 and FCS 70 is affected by weather on the next day. Processing involved with selection of the DER will be described below with reference to FIGS. 7 and 8.

Figure 7:
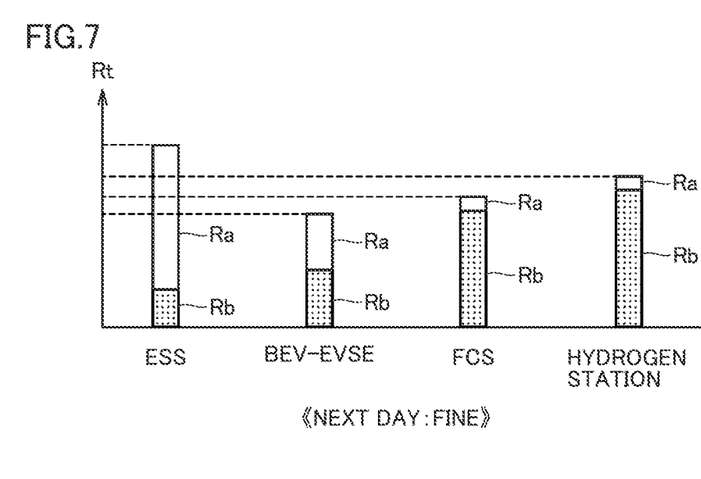
FIG. 7 is a diagram showing exemplary total loss of each DER when weather on the next day is fine.

FIG. 7 is a diagram showing exemplary total loss Rt of each DER when weather on the next day is fine. Referring to FIG. 7, when the weather on the next day is fine, supply electric power of microgrid MG tends to be high owing to photovoltaic power generation by variable renewable energy source 91 and the retention period of each of ESS 60 and FCS 70 tends to be long. Since the self-discharge ratio of ESS 60 is high, surplus electric power retained for a long period in ESS 60 tends to lead to large energy loss due to self-discharging of ESS 60 while surplus electric power is retained. Since the hydrogen leakage ratio of FCS 70 is low, energy loss while surplus electric power is retained is less likely to increase even though surplus electric power is retained in FCS 70 for a long period of time. Based on such tendency, in the example shown in FIG. 7, total loss Rt of ESS 60 is larger than total loss Rt of FCS 70.

Figure 8:
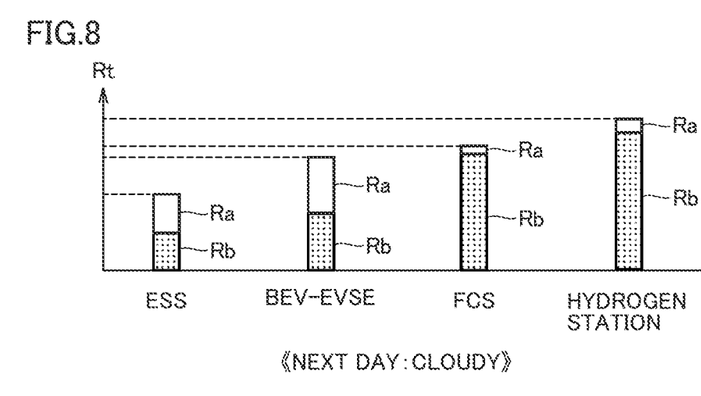
FIG. 8 is a diagram showing exemplary total loss of each DER when weather on the next day is cloudy.

FIG. 8 is a diagram showing exemplary total loss Rt of each DER when weather on the next day is cloudy. When the weather on the next day is cloudy, the retention period of each of ESS 60 and FCS 70 tends to be shorter than when the weather on the next day is fine. Therefore, energy loss while surplus electric power is retained that is caused in retaining surplus electric power in ESS 60 tends to be small. Input and output loss Rb of FCS 70 is larger than input and output loss Rb of ESS 60. Therefore, in the example shown in FIG. 8, total loss Rt of FCS 70 is larger than total loss Rt of ESS 60.

Total loss Rt of the DERs shown in FIG. 7 increases in the order of the BEV-EVSE, FCS 70, hydrogen station 80, and ESS 60. Therefore, in the example shown in FIG. 7, priority in selection in S25 lowers in the order of the BEV-EVSE, FCS 70, hydrogen station 80, and ESS 60. Therefore, in S25, the BEV-EVSE is selected preferentially over FCS 70, FCS 70 is selected preferentially over hydrogen station 80, and hydrogen station 80 is selected preferentially over ESS 60.

Total loss Rt of the DERs shown in FIG. 8 increases in the order of ESS 60, the BEV-EVSE, FCS 70, and hydrogen station 80. Therefore, in the example shown in FIG. 8, priority in selection in S25 lowers from ESS 60, the BEV-EVSE, FCS 70, and hydrogen station 80. Therefore, in S25, ESS 60 is selected preferentially over the BEV-EVSE, the BEV-EVSE is selected preferentially over FCS 70, and FCS 70 is selected preferentially over hydrogen station 80.

Though each of FIGS. 7 and 8 shows only total loss Rt of single piece of BEV-EVSE, electric power system 1 includes a plurality of pieces of BEV-EVSE. Total loss Rt is different for each piece of BEV-EVSE. BEV-EVSE small in total loss Rt is high in priority in selection in S25, and BEV-EVSE large in total loss Rt is low in priority in selection in S25.

When processing in S25 is performed, a series of processing (S12 in FIG. 4) shown in FIG. 5 ends. Then, the process proceeds to S13 in FIG. 4. Referring again to FIG. 4 together with FIGS. 1 and 2, in S13, storage control unit 113 controls DER group 500 such that surplus electric power (specifically, surplus electric power determined as "occurring" in S11) is stored in the DER selected in S12. Storage control unit 113 controls, for example, the power conversion circuit of each DER, has the selected DER connected to microgrid MG, and has the not-selected DER disconnected from microgrid MG. Surplus electric power of microgrid MG is thus stored only in the DER selected in S12. An amount of storage in each selected DER may be equal or different. Storage control unit 113 may have electric power preferentially stored in a DER high in priority in selection (that is, a DER small in total loss Rt). In order to suppress storage of electric power excessively in a single DER, an upper limit value of the amount of storage may be set. When processing in S13 is performed, the process returns to the initial step (S11).

As described above, the power management method according to this embodiment is a method of managing electric power of microgrid MG by using a plurality of DERs electrically connectable to microgrid MG, and includes S21 to S25 shown in FIG. 5. In S21 to S24, when surplus electric power occurs in microgrid MG, server 100 obtains, for each of the plurality of DERs, total loss Rt (that is, energy loss including retention loss and input and output loss) that occurs in storing energy in each DER. In S25, server 100 selects at least one DER for storing surplus electric power from among the plurality of DERs, based on obtained total loss Rt.

In S25, server 100 selects the energy storage resource for storing surplus electric power based on energy loss (including retention loss and input and output loss) caused in storing surplus electric power. Therefore, according to the power management method, surplus electric power can be stored with less energy loss.

Figure 9:
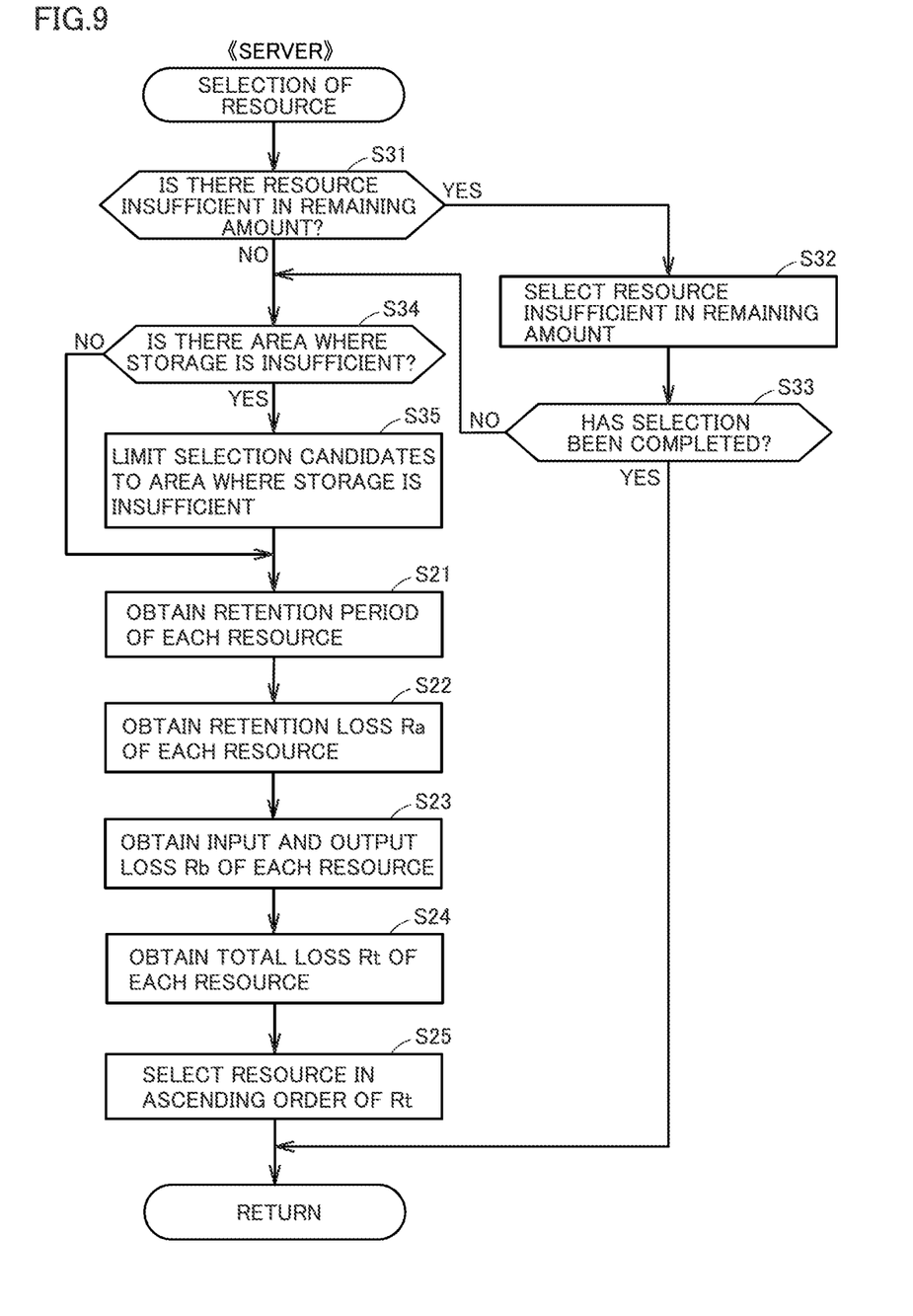
FIG. 9 is a flowchart showing a modification of the processing shown in FIG. 5.

Server 100 may perform processing shown in FIG. 9 instead of the processing shown in FIG. 5. FIG. 9 is a flowchart showing a modification of the processing shown in FIGS. 5. S21 to S25 in FIG. 9 are the same as S21 to S25 in FIG. 5.

Referring to FIG. 9 together with FIGS. 1 and 2, in S31, selector 112 determines whether or not there is a DER insufficient in remaining amount of energy in DER group 500. Selector 112 determines whether or not the remaining amount of energy in each DER is insufficient, for example, based on whether or not the remaining amount of energy in each DER is smaller than a prescribed lower limit value. The prescribed lower limit value may be different for each DER.

Figure 10:
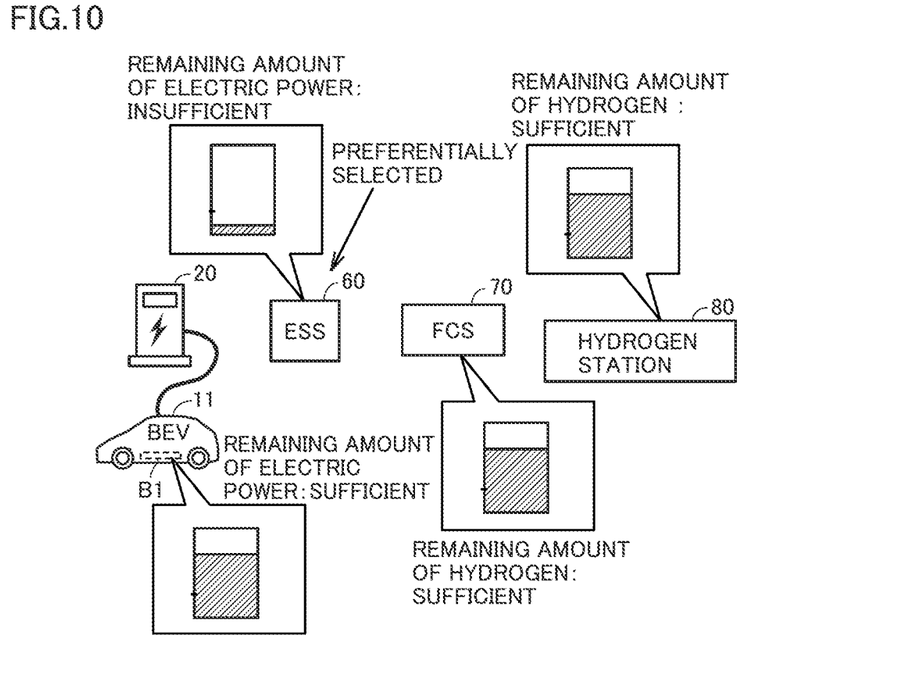
FIG. 10 is a diagram for illustrating processing for selecting an energy storage resource insufficient in remaining amount of energy in a series of processing shown in FIG. 9.

When determination as YES (there is a DER) is made is S31, in S32, selector 112 selects a DER insufficient in remaining amount of energy as the DER for storing surplus electric power. When there are a plurality of DERs insufficient in remaining amount of energy, all of such DERs are selected. FIG. 10 is a diagram for illustrating processing for selecting an energy storage resource insufficient in remaining amount of energy (S32). Referring to FIG. 10, in this example, the remaining amount of energy in ESS 60 among the BEV-EVSE, ESS 60, FCS 70, and hydrogen station 80 is smaller than the prescribed lower limit value. Therefore, in S32 in FIG. 9, ESS 60 is selected.

Referring again to FIG. 9 together with FIGS. 1 and 2, after S32, the process proceeds to S33. In S33, selector 112 determines whether or not selection of a DER for storing surplus electric power has been completed. When only DERs insufficient in remaining amount of energy are enough for storing surplus electric power, determination as YES is made in S33 and a series of processing shown in FIG. 9 (S12 in FIG. 4) ends. Then, in S13 in FIG. 4, surplus electric power is evenly stored in DERs insufficient in remaining amount of energy.

When only DERs insufficient in remaining amount of energy are not enough for storing surplus electric power, determination as NO is made in S33, and the process proceeds to S34. When determination as NO (there is no DER) is made in S31 as well, the process proceeds to S34.

In S34, selector 112 determines whether or not there is an area insufficient in remaining amount of energy in the city to which electric power is supplied from microgrid MG. When determination as YES (there is an area) is made in S34, in S35, selector 112 limits a candidate for a DER for storing surplus electric power to a DER located in the area insufficient in remaining amount of energy. Thereafter, the process proceeds to S21.

Figure 11:
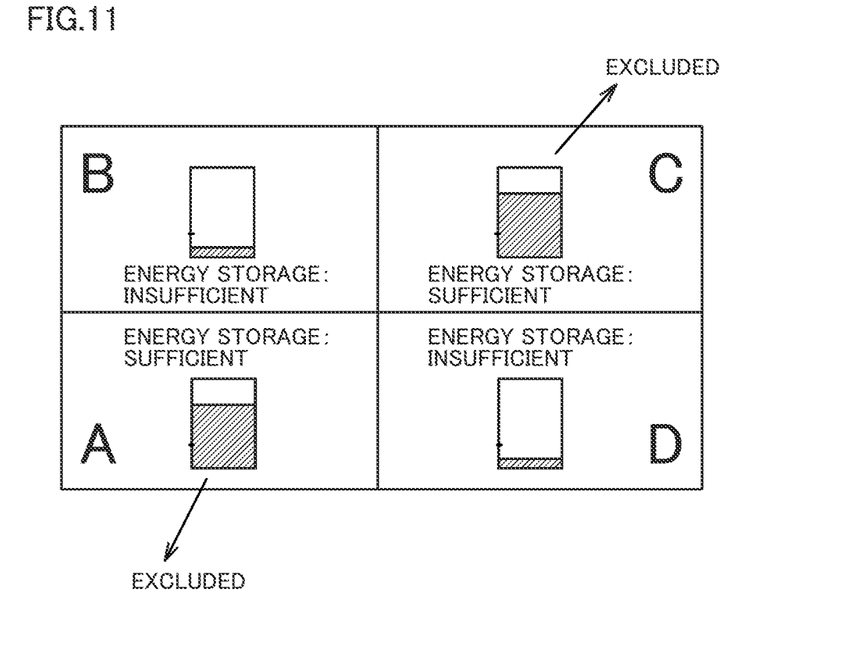
FIG. 11 is a diagram for illustrating processing for limiting a selection candidate to a DER in an area insufficient in remaining amount of energy in the series of processing shown in FIG. 9.

FIG. 11 is a diagram for illustrating processing for limiting a selection candidate to a DER in an area insufficient in remaining amount of energy (S34 and S35). Referring to FIG. 11 together with FIGS. 1 and 2, in this example, the city to which electric power is supplied from microgrid MG is divided into four areas A to D. Then, information manager 114 is configured to manage the remaining amount of energy for each area. In this example, the remaining amount of energy in one area means the sum of amounts of remaining energy in all DERs located in that area. In S34 in FIG. 9, selector 112 determines whether or not the remaining amount of energy in each area is insufficient based on whether or not the remaining amount of energy in each area is smaller than a prescribed lower limit value. The prescribed lower limit value may be different for each area. In the example shown in FIG. 11, the remaining amount of energy in each of areas B and D among areas A to D is smaller than the prescribed lower limit value. Therefore, determination as YES (there is an area) is made in S34 in FIG. 9 and in S35 in FIG. 9, and a selection candidate (that is, a candidate for the DER for storing surplus electric power) is limited to DERs located in areas B and D. In other words, DERs located in areas A and C are excluded from selection candidates. In S21 to S25 in FIG. 9, DERs for storing surplus electric power are thus selected from among the BEV-EVSE, ESS 60, FCS 70, and hydrogen station 80 located in areas B and D.

When the remaining amount of energy in all of areas A to D is equal to or larger than the prescribed lower limit value, determination as NO (there is no area) is made in S34. In this case, the process proceeds to S21 without the selection candidate being limited.

When there is a DER insufficient in remaining amount of energy in DER group 500 (YES in S31 in FIG. 9), selector 112 according to the modification selects a DER insufficient in remaining amount of energy as the DER for storing the surplus electric power (S32 in FIG. 9), and when there is no DER insufficient in remaining amount of energy in DER group 500 (NO in S31 in FIG. 9), selector 112 selects at least one DER for storing surplus electric power, in the ascending order of total loss Rt (that is, energy loss including retention loss and input and output loss) caused in storing surplus electric power (S21 to S25 in FIG. 9). According to such a configuration, too small a remaining amount of energy in a DER can be suppressed.

Selector 112 according to the modification obtains the remaining amount of energy for each area. Then, when there is an area insufficient in remaining amount of energy (YES in S34 in FIG. 9), selector 112 limits a candidate for the DER for storing surplus electric power to a DER located in the area insufficient in remaining amount of energy (S35 in FIG. 9). According to such a configuration, surplus electric power can be stored preferentially in a DER located in the area insufficient in remaining amount of energy. Too small a remaining amount of energy in the area can thus be suppressed.

In the embodiment, when surplus electric power stored in the vehicle is used for travel of the vehicle as well, energy lost during travel is handled as energy loss. Without being limited as such, energy lost during travel of the vehicle may be handled as effectively used energy, rather than energy loss. In other words, energy loss may be calculated with energy lost during travel of the vehicle being excluded.

In the embodiment, loss information for each vehicle is prepared in server 100 in consideration of individual variation among vehicles. Such a configuration, however, is not essential. For example, average data for each vehicle type may be employed as loss information of vehicles that fall under that vehicle type. Server 100 may sequentially update average data for each vehicle type based on statistical data (for example, big data) by machine learning.

Server 100 may control DER group 500 in coordination with another server. DERs included in DER group 500 may be grouped and a server (for example, a server that manages DERs within the group) may be provided for each group. For example, a server that controls an EMS may be provided for each EMS. Then, server 100 may control DER group 500 through the server for each group.

The configuration of the vehicle adopted as the energy storage resource is not limited to the configuration shown in the embodiment. For example, it is not essential that the vehicle includes the communication apparatus for wireless communication with server 100. A plug-in hybrid electric vehicle (PHEV) may be adopted as the energy storage resource. The vehicle may be configured to be wirelessly chargeable. The vehicle is not limited to a passenger car, and a bus or a truck may be applicable. The vehicle may be an autonomous vehicle or may perform a flying function. The vehicle may be a vehicle that can travel without human intervention (for example, an automated guided vehicle (AGV) or an agricultural implement).

Though the server and the power management method are applied to energy management of an AC (alternating-current) grid in the embodiment, the server and the power management method described above may be applied to energy management of a DC (direct-current) grid.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A server that manages energy of a power grid by using a plurality of energy storage resources, the server comprising:
 a loss obtaining unit that obtains for each of the plurality of energy storage resources, energy loss including retention loss and input and output loss, the energy loss being caused in storing energy in each energy storage resource; and
 a selector that selects, when surplus electric power occurs in the power grid, at least one energy storage resource for storing the surplus electric power from among the plurality of energy storage resources, based on the energy loss caused in storing the surplus electric power.

2. The server according to claim 1, wherein
 when the surplus electric power occurs in the power grid, the loss obtaining unit predicts a retention period for each of the plurality of energy storage resources and obtains the retention loss based on the predicted retention period, the retention period being a period during which the surplus electric power is retained in an energy storage resource in storing the surplus electric power in the energy storage resource.

3. The server according to claim 2, wherein
 the plurality of energy storage resources include at least one of a stationary power storage and a stationary fuel cell, and
 the loss obtaining unit predicts a supply sufficiency period and obtains the retention period of at least one of the stationary power storage and the stationary fuel cell based on the predicted supply sufficiency period, the supply sufficiency period being a period from occurrence of the surplus electric power in the power grid until demand electric power of the power grid exceeds supply electric power of the power grid.

4. The server according to claim 3, wherein
 the power grid is configured to supply electric power to a plurality of houses,
 the power grid is configured to receive supply of electric power from a variable renewable energy source in which power generation output varies depending on a meteorological condition, and
 the loss obtaining unit predicts the demand electric power and the supply electric power of the power grid based on meteorological prediction information.

5. The server according to claim 2, wherein
 the plurality of energy storage resources include a vehicle including a power storage connectable to a power feed facility outside the vehicle, and
 the loss obtaining unit predicts the retention period of the vehicle based on a travel plan of the vehicle.

6. The server according to claim 2, wherein
 the plurality of energy storage resources include a hydrogen station configured to supply hydrogen to a fuel cell electric vehicle, and
 the loss obtaining unit predicts hydrogen addition timing of the fuel cell electric vehicle based on a remaining amount of hydrogen and a travel plan of the fuel cell electric vehicle and predicts the retention period of the hydrogen station based on the predicted hydrogen addition timing.

7. The server according to claim 1, wherein
the selector selects at least the one energy storage resource for storing the surplus electric power in an ascending order of the energy loss caused in storing the surplus electric power.

8. The server according to claim 1, wherein
when there is an energy storage resource insufficient in remaining amount of energy among the plurality of energy storage resources, the selector selects the energy storage resource insufficient in remaining amount of energy as the at least one energy storage resource for storing the surplus electric power, and
when there is no energy storage resource insufficient in remaining amount of energy among the plurality of energy storage resources, the selector selects the at least one energy storage resource for storing the surplus electric power in an ascending order of the energy loss caused in storing the surplus electric power.

9. The server according to claim 1, wherein
when there is an area insufficient in remaining amount of energy, the selector limits a candidate for the energy storage resource for storing the surplus electric power to energy storage resources present in the area insufficient in remaining amount of energy.

10. The server according to claim 1, further comprising a storage control unit that controls the plurality of energy storage resources such that the surplus electric power is stored in the at least one energy storage resource selected by the selector.

11. A method of managing electric power of a power grid by using a plurality of energy storage resources electrically connectable to the power grid, the method comprising:
   obtaining, when surplus electric power occurs in the power grid, for each of the plurality of energy storage resources, energy loss including retention loss and input and output loss, the energy loss being caused in storing energy in each energy storage resource; and
   selecting at least one energy storage resource for storing the surplus electric power from among the plurality of energy storage resources, based on the obtained energy loss.

* * * * *